United States Patent
Cho

(10) Patent No.: US 8,972,793 B2
(45) Date of Patent: Mar. 3, 2015

(54) APPARATUS AND METHOD FOR ANALYZING ERROR GENERATION IN MOBILE TERMINAL

(75) Inventor: Soon-Yong Cho, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 253 days.

(21) Appl. No.: 13/091,467

(22) Filed: Apr. 21, 2011

(65) Prior Publication Data

US 2011/0264960 A1 Oct. 27, 2011

(30) Foreign Application Priority Data

Apr. 22, 2010 (KR) .................. 10-2010-0037238

(51) Int. Cl.
 G06F 11/00 (2006.01)
 G06F 11/36 (2006.01)
 G06F 11/07 (2006.01)
(52) U.S. Cl.
 CPC .......... *G06F 11/366* (2013.01); *G06F 11/0742* (2013.01); *G06F 11/0778* (2013.01)
 USPC ..................................... 714/38.11
(58) Field of Classification Search
 USPC ......................... 714/30, 31, 38.11
 See application file for complete search history.

(56) References Cited

U.S. PATENT DOCUMENTS

| | | | | |
|---|---|---|---|---|
| 6,182,243 | B1* | 1/2001 | Berthe et al. | 714/38.11 |
| 6,792,559 | B1* | 9/2004 | Cohen et al. | 714/15 |
| 7,191,364 | B2* | 3/2007 | Hudson et al. | 714/38.11 |
| 7,321,988 | B2* | 1/2008 | Guo et al. | 714/38.11 |
| 7,702,959 | B2* | 4/2010 | Hwang et al. | 714/38.11 |
| 2009/0228548 | A1* | 9/2009 | Kakiya | 709/203 |
| 2009/0327815 | A1* | 12/2009 | Sridharan et al. | 714/38 |

OTHER PUBLICATIONS

Tanenbaum, Andrew S.; "Structured Computer Organization (Second Edition)"; Prentice Hall, Inc.; 1984; pp. 10-12.*

* cited by examiner

*Primary Examiner* — Scott Baderman
*Assistant Examiner* — Joseph Kudirka
(74) *Attorney, Agent, or Firm* — Jefferson IP Law, LLP

(57) ABSTRACT

An apparatus and a method for determining error generation in a mobile terminal are provided. More particularly, an apparatus and a method for analyzing and reporting an error of a device driver in real-time without a separate debugging apparatus in a mobile terminal are provided. The apparatus includes a dumper and an analyzer. When an error-generating device exists, the dumper retrieves error information used for analyzing an error generating cause from a register range of the error-generating device, and receives dumped information corresponding to the retrieving of the error information. The analyzer analyzes the dumped information to determine the error generating cause.

23 Claims, 4 Drawing Sheets

APPARATUS AND METHOD FOR ANALYZING ERROR GENERATION IN MOBILE TERMINAL

PRIORITY

This application claims the benefit under 35 U.S.C. §119(a) of a Korean patent application filed in the Korean Intellectual Property Office on Apr. 22, 2010 and assigned Serial No. 10-2010-0037238, the entire disclosure of which is hereby incorporated by reference.

BACKGROUND OF THE INVENTION

1. Field of the Invention

The present invention relates to an apparatus and a method for determining error generation in a mobile terminal. More particularly, the present invention relates to an apparatus and a method for analyzing and reporting an error of a device driver in real-time without a separate debugging apparatus in a mobile terminal.

2. Description of the Related Art

Recently, mobile terminals are widely distributed and used due to their convenience in portability. Therefore, terminal manufacturers develop the mobile terminals having an increasing number of functions in order to improve functionality of the mobile terminals.

For example, the mobile terminals provide functions such as a phonebook, a game, a scheduler, a Short Message Service (SMS), a Multimedia Message Service (MMS), a Broadcast Message Service (BMS), an Internet service, an Electronic mail (Email) service, a morning call, a Motion Picture Expert Group (MPEG)-1 or MPEG-2 Audio Layer-3 (MP3) player, a digital camera, and other similar products and services.

The mobile terminals pass through quality assurance and product testing processes to find out various errors and remove them during a research and development stage before the mobile terminals are sold to a user in a commercial market. During the quality assurance and product testing process, debugging is performed by monitoring lines of code of a program file to find which lines generate errors and which information is provided using a debugging program in order to remove errors from the lines of the code.

A mobile terminal that has passed through the error removing process and has been sold to a user has various devices internal to the mobile terminal, and so an error associated with a specific device may be generated after the error removing process. Generally, the mobile terminal performs a debugging method using a dump tool provided by an Operating System (OS), or performs a debugging process associated with an error generated using hardware that may be costly equipment.

At this point, the debugging method using the dump tool determines a cause of an error by analyzing log information of the mobile terminal. The debugging process using the high-priced equipment is accompanied by a cost problem caused by equipment purchase. In addition, a path that can reproduce the generated error and an actual reproduction result are used and may not be easily repeatable, thus, it may take much time to perform the debugging process.

In a case where a manufacturer of the mobile terminal has sufficiently determined reproduction paths of various errors in the development stage, error generating causes may be analyzed and solved to some extent, but an error whose reproduction path is inaccurate is difficult to reproduce, so that much difficulty occurs in analyzing the error generating cause.

Therefore, an apparatus and a method for obtaining information regarding an error whose reproduction path is inaccurate, and analyzing an error generating cause using the obtained information are desired.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for analyzing an error of a device driver internally in a mobile terminal.

Another aspect of the present invention is to provide an apparatus and a method for analyzing an error of a device driver in real-time in a mobile terminal.

Still another aspect of the present invention is to provide an apparatus and a method for obtaining error information within a range of a register associated with an error-generating device when determining the error of a device driver in a mobile terminal.

Yet another aspect of the present invention is to provide an apparatus and a method for analyzing and reporting an error of a device driver in a mobile terminal.

In accordance with an aspect of the present invention, an apparatus for analyzing error generation in a mobile terminal is provided. The apparatus includes a dumper for, when an error-generating device exists, retrieving error information used for analyzing an error generating cause from a register range of the error-generating device, and for receiving dumped information corresponding to the retrieving of the error information, and an analyzer for analyzing the dumped information to determine the error generating cause.

In accordance with another aspect of the present invention, a method for analyzing error generation in a mobile terminal is provided. The method includes, when an error-generating device exists, retrieving error information used for analyzing an error generating cause from a register range of the error-generating device, receiving dumped information corresponding to the retrieving of the error information, and analyzing the dumped information to determine the error generating cause.

In accordance with still another aspect of the present invention, an error detector for analyzing an error of a device is provided. The error detector includes a dumper for, when an error-generating device exists, retrieving error information used for analyzing an error generating cause from a register range of the error-generating device, and for receiving dumped information corresponding to the retrieving of the error information, an analyzer for analyzing the dumped information to determine the error generating cause, an interface determining unit for determining and providing information regarding a communication state of the error-generating device, a register determining unit for providing a register corresponding to the error-generating device, and a memory determining unit for providing a memory map address allocated to the error-generating device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
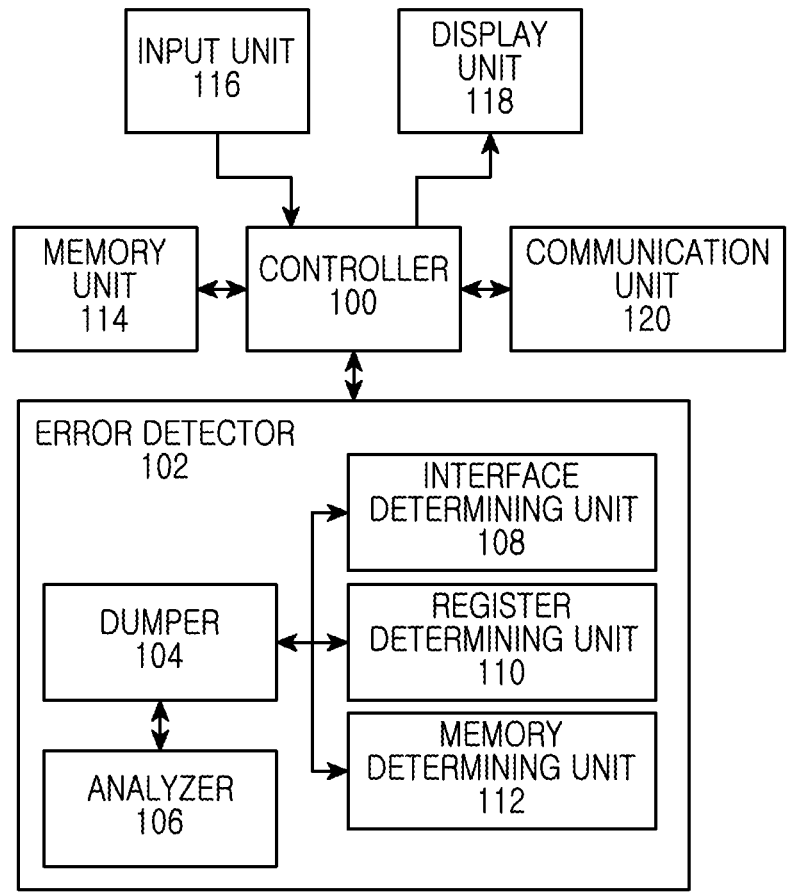
FIG. 1 is a block diagram illustrating a mobile terminal that performs a process for analyzing error generation according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and a method for determining an error of a device driver internally without a separate debugging apparatus by obtaining error information within a register range associated with an error-generating device when determining error generation of a device driver in a mobile terminal.

FIGS. 1 through 4, described below, and the various exemplary embodiments of the present invention provided are by way of illustration only and should not be construed in any way that would limit the scope of the present invention. Those skilled in the art will understand that the principles of the present disclosure may be implemented in any suitably arranged communications system. The terms used to describe various exemplary embodiments of the present invention are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a block diagram illustrating a mobile terminal that performs a process for analyzing error generation according to an exemplary embodiment of the present invention.

Referring to FIG. 1, the mobile terminal may include a controller 100, an error detector 102, a memory unit 114, an input unit 116, a display unit 118, and a communication unit 120. The error detector 102 may include a dumper 104, an analyzer 106, an interface determining unit 108, a register determining unit 110, and a memory determining unit 112. However, the present invention is not limited thereto, and the mobile terminal may include additional units that are not illustrated here merely for sake of clarity. Similarly, the functionality of two or more of the above units may be integrated into a single component.

The controller 100 controls an overall operation of the mobile terminal, such as processes and controls for voice communication and data communication. In addition to the general functions, when determining error generation of a device driver, the controller 100 internally analyzes an error of the device driver in real-time without a separate debugging apparatus by obtaining error information within a register range associated with the error-generating device.

That is, when determining that the error-generating device exists, the controller 100 retrieves information, such as log message information, register information, interface information, memory information, or other such information used for analyzing an error of the error-generating device, or a relevant device. The relevant device may be a device other than the error-generating device that is determined to be relevant to the error of the error-generating device.

After that, the controller 100 analyzes dumped information corresponding to the retrieved information in order to determine an error-generating cause, and reports the determined error-generating cause to a manufacturing company of the error-generating device or the relevant device.

The error detector 102 analyzes the error-generating cause of the error-generating device under control of the controller 100, and provides the analyzed cause to the controller 100 so that the controller 100 may report the error-generating cause. For example, the error detector 102 receives a shot button for capturing an image, wherein the shot button may be program code for a graphical user interface button executing the capturing of the image, and then determines whether an operation corresponding to the received shot button is properly performed in order to determine if a device is error-generating, and then analyzes an error-generating cause of the error-generating device for the capturing of the image.

At this juncture, the error detector 102 receives dumped information regarding a communication state of a relevant device from the interface determining unit 108, and receives register information of a back end processor and register information corresponding to a relevant device from the register determining unit 110. In addition, the error detector 102 receives a memory map address allocated to the device from the memory determining unit 112 and requests data stored by the device in order to receive the dumped information regarding the communication state and other relevant data.

The error detector 102 that has received the dumped information determines an error-generating cause through the analyzer 106.

The dumper 104 of the error detector 102 calls for an information dump, or in other words, retrieves information for the information dump, in order to analyze an error generated by a device under control of the error detector 102, and provides the dumped information to the analyzer 106.

The analyzer 106 analyzes the dumped information provided from the dumper 104 in order to determine an error-generating cause of the error-generating device or the relevant device. The analyzer 106 also provides the analyzed dumped information to the controller 100.

The memory 112 includes Read Only Memory (ROM), Random Access Memory (RAM), a flash ROM or other similar storage devices. The ROM stores microcodes of programs for processes and controls of the controller 100 and the error detector 102, and various reference data.

The RAM serves as a working memory of the controller 100 and stores temporary data that is generated during execution of various programs. In addition, the flash ROM stores various updatable data for storage such as a phonebook, calling messages, received messages, and other similar data.

The input unit 116 includes a plurality of function keys such as numerical key buttons of 0 to 9, a menu button, a cancel button, an OK button, a TALK button, an END button, an Internet access button, navigation key buttons, letter input keys, and other similar input keys and buttons. The input unit 116 provides key input data, corresponding to a key pressed by a user, to the controller 100.

The display unit 118 displays status information generated during an operation of the mobile terminal, alpha-numeric characters, moving images, still images, or other graphically displayed information. The display unit 118 may be a color Liquid Crystal Display (LCD), an Active Mode Organic Light Emitting Diode (AMOLED) display, and any other suitable display apparatus. The display unit 118 may include a touch input device that can be used as an input unit.

The communication unit 120 transmits and receives a Radio Frequency (RF) signal of data via an antenna (not illustrated). For example, during transmission, the communication unit 120 channel-codes and spreads data to be transmitted, and then performs an RF process on the signal to transmit the signal. During reception, the communication unit 120 converts a received RF signal into a baseband signal, and despreads and channel-decodes the baseband signal to recover data.

The function of the error detector 102 may be performed by the controller 100 of the mobile terminal. The separate configuration and illustration of the error detector 102 for exemplary purpose for convenience in description, and the present invention is not limited thereto, and the error detector may be configured in other suitable manners. It would be obvious to those skilled in the art that various modifications may be made within the scope of the present invention. For example, all functions of the error detector 102 may be processed by the controller 100.

Figure 2:
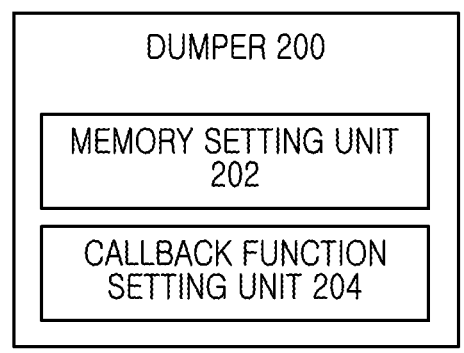
FIG. 2 is a block diagram illustrating a dumper for analyzing an error according to an exemplary embodiment of the present invention.

FIG. 2 is a block diagram illustrating a dumper for analyzing an error according to an exemplary embodiment of the present invention.

Referring to FIG. 2, the dumper 200 for analyzing an error includes a memory setting unit 202 and a callback function setting unit 204.

The memory setting unit 202 sets a register range of a back end processor suitable for a characteristic of each device included in the mobile terminal, and sets a range of a memory used for the device or a device driver, and a register range of a memory for determining a state of an interface for communication of the device. This may be set by a manufacturing company that manufactures each device, and may store a setting value set by the manufacturing company.

The callback function setting unit 204 is a block for setting a function for calling information used for analyzing an error generating cause. The error detector 102 calls for or retrieves information regarding a communication state of a relevant device from the interface determining unit 108 using a callback function set by the callback function setting unit 204, and calls register information of a back end processor and register information corresponding to a relevant device to the register determining unit 110. In addition, the error detector 102 receives a memory map address allocated to the device through the memory determining unit 112 in order to call data stored by the device, thereby receiving relevant dumped information.

Figure 3:
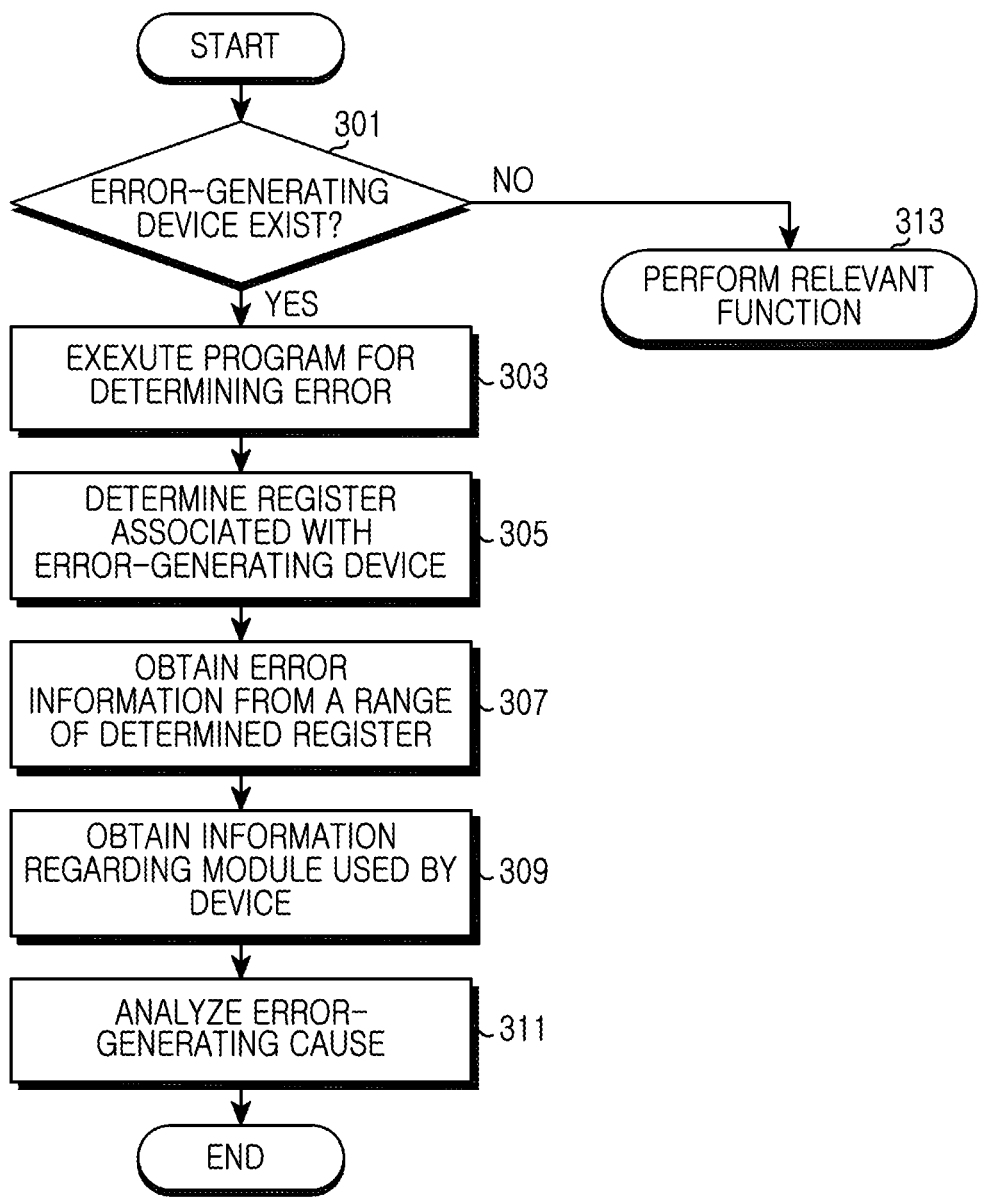
FIG. 3 is a flowchart illustrating a process for analyzing an error of a device driver in real-time in a mobile terminal according to an exemplary embodiment of the present invention.

FIG. 3 is a flowchart illustrating a process for analyzing an error of a device driver in real-time in a mobile terminal according to an exemplary embodiment of the present invention.

Referring to FIG. 3, the mobile terminal determines whether an error-generating device exists in step 301. Step 301 is a process for determining whether an error is generated during an operation of a device such as a Bluetooth module of the mobile terminal, a wireless network module for any of Code Division Multiple Access (CDMA), General Packet Radio Services (GPRS), Wideband CDMA (WCDMA), Wireless Fidelity (WiFi), Worldwide Interoperability for Microwave Access (WiMAX), and Long Term Evolution (LTE), a camera module, or other similar devices or modules.

If it is determined that the error-generating device does not exist or that a relevant device does not generate an error in an error-generating device in step 301, the mobile terminal proceeds to step 313 to perform a relevant function such as a control of an operation of the relevant device.

In contrast, if it is determined that the error-generating device exists in step 301, the mobile terminal proceeds to step 303 to execute a program for determining an error. Here, the program for the determining of the error is a program for analyzing an error of an error-generating device, and is executed by the error detector 102 of FIG. 1.

The mobile terminal determines a register associated with the error-generating device in step 305, and obtains error information from a range of the determined register corresponding to the error-generating device in step 307.

The mobile terminal obtains information regarding a module used by the error-generating device in step 309, and analyzes the obtained information to determine an error-generating cause in step 311. Here, the information regarding the module used by the error-generating device is information for determining a communication state between the error-generating device and a module used by the error-generating device, and may include interface state information of the error-generating device.

After that, the mobile terminal ends the present process of the embodiment of FIG. 3.

Figure 4:
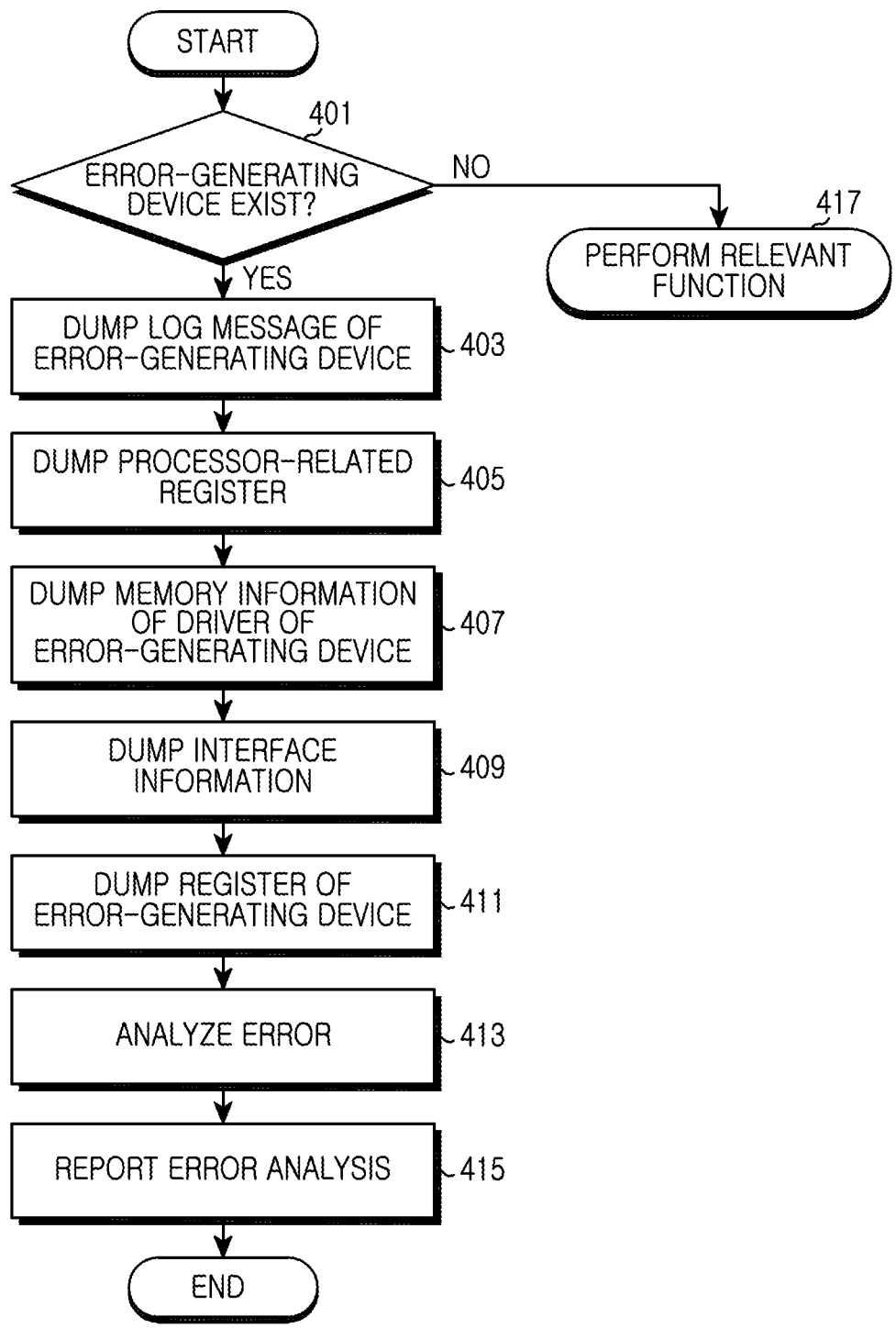
FIG. 4 is a flowchart illustrating a process for analyzing an error of a device driver in real-time in a mobile terminal according to an exemplary embodiment of the present invention.

FIG. 4 is a flowchart illustrating a process for analyzing an error of a device driver in real-time in a mobile terminal according to an exemplary embodiment of the present invention.

Referring to FIG. 4, the mobile terminal determines where an error-generating device exists in step 401. Similar to step 301 of the embodiment of FIG. 3, as described above, step 401 is a process for determining whether an error is generated during an operation of a device such as a Bluetooth module of the mobile terminal, a wireless network module for any of CDMA, GPRS, WCDMA, WiFi, Wimax, LTE, a camera module, or other similar modules or devices.

If it is determined that the error-generating device does not exist or that a relevant device does not generate an error in the error-generating device in step 401, the mobile terminal performs a relevant function, such as controlling an operation of the relevant device, in step 417.

In contrast, if it is determined that the error-generating device exists in step 401, the mobile terminal receives dumped information regarding the error-generating device, such as log message information, processor-related register information, memory information, interface information, or other similar information in step 403. After the mobile terminal has received the dumped log message information or other similar information of the error-generating device in order to analyze error generation, the mobile terminal proceeds to step 405 to receive a dumped register related to a back end processor.

The mobile terminal receives dumped memory information of the error-generating device in step 407. This is for analyzing data stored in a memory through the device in order to analyze the generated error. By doing so, the mobile terminal obtains information used for analyzing the error of the error-generating device.

The mobile terminal receives dumped information representing a state of an interface used by the error-generating device during communication in step 409, and receives a dumped register of the error-generating device or the relevant device in step 411. Here, step 409 is for obtaining information representing an interface state in order to determine whether the error of the error-generating device has been generated on the interface. Step 411 is for obtaining information regarding an Internet Protocol (IP) block of the error generating device or the relevant device allocated to the mobile terminal. The received dumped information may be obtained by calling a callback function to a block that provides information in the case where the mobile terminal determines that there is an error-generating device.

The mobile terminal performs a process for analyzing an error using the dumped information in step 413.

At this point, unlike the conventional error analysis process, the mobile terminal may analyze a generated error without using separate equipment. In addition, the mobile terminal may determine an error generating cause without reproducing an error using the dumped information and immediately determine an error generating cause upon generation of an error.

The mobile terminal that has analyzed the error generating cause in step 413 reports the analyzed error generating cause to a manufacturing company of the error-generating device or the relevant device in step 415. The manufacturing company easily obtains information regarding the error generation and may determine a state of the back end processor and also a state of a module connected to the error-generating device or the relevant device.

After that, the mobile terminal ends the present process of the exemplary embodiment of FIG. 4.

Hereinafter, an operation for determining that an error is generated to a camera unit of a mobile terminal and determining an error generating cause is described according to an exemplary embodiment of the present invention.

In a case where a user of the mobile terminal inputs a shot button for capturing an image, or in other words, the user executes the capturing of the image by inputting a shot button command in order to capture the image using a camera unit, the mobile terminal transmits a command that allows a driver driving the camera unit to process an operation corresponding to the input to the camera unit.

After that, the driver determines whether the operation command corresponding to the input is properly transferred and a relevant operation is performed through a response provided from the camera unit.

When determining that the relevant operation has not been properly performed in the above process, the mobile terminal receives dumped interface state information for determining a communication state between the camera unit, a driver of the camera unit, and a memory through the dumper 104 of the error detector 102.

In addition, the mobile terminal receives dumped storage information of image data captured by the camera unit and dumped information regarding an IP block corresponding to the camera unit through the dumper 104, and then allows the analyzer 106 to determine an error generating cause.

Accordingly, the analyzer 106 determines an error generating cause using a communication state of the camera unit, a data storage state, and register information, and proceeds to report the determined error generating cause to a relevant camera unit manufacturing company.

As described above, exemplary embodiments of the present invention provide an apparatus and a method for determining an error generating cause of a device driver in real-time in a mobile terminal. When determining error generation of the device driver, the apparatus and the method obtain error information within a range of a register associated with the error-generating device in order to analyze and report an error generating cause, thereby determining the error generating cause without high-priced equipment and while analyzing an error whose reproduction path is inaccurate or difficult to reproduce.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal, the mobile terminal comprising:
an error-generated device; and
a controller configured to retrieve error information from a register range of the error-generated device, the retrieved error information being used for analyzing an error-generating cause, to receive dumped information corresponding to the retrieved error information, the received dumped information being received by calling a callback function to a block that provides each information in the case where the mobile terminal determines the error-generated device, and to determine the error-generating cause based on the received dumped information.

2. The mobile terminal of claim 1, wherein the controller reports the determined error-generating cause to a manufacturing company of the mobile terminal.

3. The mobile terminal of claim 1, wherein the controller retrieves the error information used for analyzing the error-generating cause through at least one of calling register information related to the error-generated device and retrieving information regarding a module used by the error-generated device.

4. The mobile terminal of claim 1, wherein the received dumped information further comprises register information related to a back-end processor.

5. The mobile terminal of claim 3, wherein the controller retrieves the information regarding the module used by the error-generated device by retrieving interface information for determining a communication state of the error-generated device, and retrieve memory information that stores data related to the error-generated device.

6. The mobile terminal of claim 1, wherein the controller comprises:
   a memory setting unit configured to set the register range of the error-generated device and a memory range; and
   a callback function setting unit configured to set a callback function corresponding to relevant information, wherein the controller retrieves error information within the register range of the error-generated device using the set callback function.

7. The mobile terminal of claim 1, wherein, when the error-generated device exists, the controller determines the error-generating cause in real-time.

8. The mobile terminal of claim 1, wherein the error-generated device comprises at least one of a device performing a function on the mobile terminal and a device relevant to the device performing the function on the mobile terminal.

9. The mobile terminal of claim 1, wherein no device external to the mobile terminal is used for the analyzing of the error-generating cause.

10. A method, the method comprising, when an error-generated device within a mobile terminal exists:
    retrieving, by a controller in the mobile terminal, error information from a register range of the error-generated device, the retrieved error information being used for analyzing an error-generating cause;
    receiving, by the controller, dumped information corresponding to the retrieved error information, the received dumped information being received by calling a callback function to a block that provides each information in the case where the mobile terminal determines the error-generated device; and
    determining, by the controller, the error-generating cause based on the received dumped information.

11. The method of claim 10, determined error-generating cause is reported to a manufacturing company of the mobile terminal.

12. The method of claim 10, wherein the retrieving of the error information used for analyzing the error-generating cause comprises:
    retrieving register information related to the error-generated device; and
    retrieving information regarding a module used by the error-generated device.

13. The method of claim 10, wherein the received dumped information further comprises register information related to a back-end processor.

14. The method of claim 12, wherein the retrieving of the information regarding a module used by the error-generated device comprises:
    retrieving interface information for determining a communication state of the error-generated device; and
    retrieving memory information that stores data related to the error-generated device.

15. The method of claim 10, wherein the retrieving of the error information being used for analyzing the error-generating cause comprises:
    setting a callback function corresponding to relevant information; and
    retrieving error information from the register range of the error-generated device using the set callback function.

16. The method of claim 10, wherein, when the error-generated device exists, the determining of the error-generating cause occurs in real-time.

17. The method of claim 10, wherein the error-generated device comprises at least one of a device performing a function on the mobile terminal and a device relevant to the device performing the function on the mobile terminal.

18. The method of claim 10, wherein the analyzing of the error-generating cause does not utilize a device external to the mobile terminal.

19. An error detector of a mobile terminal, the error detector comprising:
    a controller;
    a dumper configured to, when an error-generated device within the mobile terminal exists:
       retrieve error information from a register range of the error-generated device, and
       receive dumped information corresponding to the retrieved error information, the received dumped information being received by calling a callback function to a block that provides each information in the case where the mobile terminal determines the error-generated device;
    an analyzer configured to analyze the received dumped information to determine an error-generating cause;
    an interface determining unit configured to determine and to provide information regarding a communication state of the error-generated device;
    a register determining unit configured to provide a register corresponding to the error-generated device; and
    a memory determining unit configured to provide a memory map address allocated to the error-generated device.

20. The error detector of claim 19, wherein the error detector reports the determined error-generating cause to a manufacturing company of the mobile terminal.

21. The error detector of claim 19, wherein the analyzer determines the error-generating cause using at least one of a communication state of the error-generated device, a data storage state, and register information.

22. The error detector of claim 19, wherein the error-generated device comprises at least one of a device performing a function on a mobile terminal and a device relevant to the device performing the function on the mobile terminal.

23. The error detector of claim 19, wherein the error detector does not use a device external to the mobile terminal for the analyzing of the error-generating cause.

* * * * *